(12) United States Patent
Zhang et al.

(10) Patent No.: US 11,675,458 B2
(45) Date of Patent: Jun. 13, 2023

(54) TOUCH DETECTION DEVICE, ELECTRONIC APPARATUS AND TOUCH DETECTION METHOD

(71) Applicant: SILEAD INC., Shanghai (CN)

(72) Inventors: Wukang Zhang, Shanghai (CN); Weiguo Li, Shanghai (CN); Jun Yang, Shanghai (CN)

(73) Assignee: SILEAD INC., Shanghai (CN)

( * ) Notice: Subject to any disclaimer, the term of this patent is extended or adjusted under 35 U.S.C. 154(b) by 0 days.

(21) Appl. No.: 17/724,613

(22) Filed: Apr. 20, 2022

(65) Prior Publication Data

US 2023/0138208 A1  May 4, 2023

(30) Foreign Application Priority Data

Oct. 28, 2021 (CN) .......................... 202111266424.9

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05)

(58) Field of Classification Search
CPC .... G06F 3/044; G06F 3/04166; G06F 3/0418; G06F 3/0446
See application file for complete search history.

(56) References Cited

U.S. PATENT DOCUMENTS

| 2017/0262092 | A1* | 9/2017 | Wu | G06F 3/0445 |
| 2019/0079609 | A1* | 3/2019 | Jiang | G06F 3/04166 |
| 2019/0385551 | A1* | 12/2019 | Kim | G09G 3/3659 |
| 2020/0192520 | A1* | 6/2020 | Guedon | G06F 3/0418 |
| 2021/0117025 | A1* | 4/2021 | Huang | G06N 3/0454 |
| 2021/0373736 | A1* | 12/2021 | Chen | G06F 3/04184 |

* cited by examiner

*Primary Examiner* — Md Saiful A Siddiqui
(74) *Attorney, Agent, or Firm* — Ziegler IP Law Group, LLC

(57) ABSTRACT

The present invention relates to a touch detection device, an electronic apparatus and a touch detection method. Each frame of touch related data corresponding to n*m capacitive nodes is obtained by producing n*m coupled signals from encoding operations and subjecting the n*m coupled signals to multiple access accumulation process, common mode suppression process, ADC process and decoding processes. Additionally, touch location information of the n*m capacitive nodes is obtained by acquiring two consecutive frames of touch related data and performing a subtraction operation between the two consecutive frames of touch related data. Therefore, relatively high touch sensing sensitivity is achievable. Before the subtraction operation, common-mode analog voltage amounts subtracted in the common mode suppression process may be not added back for each single frame of touch related data obtained from decoding process. This avoids introduction of errors, as well as a larger circuitry area and increased power consumption.

7 Claims, 4 Drawing Sheets

LOADING, IN EACH ENCODING CYCLE, ENCODED DRIVE SIGNALS ONTO THE INDIVIDUAL DRIVING CHANNELS, CAPTURING, THROUGH THE INDIVIDUAL SENSING CHANNELS, N*M COUPLED SIGNALS PRODUCED AT THE INDIVIDUAL CAPACITIVE NODES, AND ACQUIRING ONE FRAME OF TOUCH RELATED DATA CORRESPONDING TO THE N*M CAPACITIVE NODES BY PERFORMING MULTIPLE ACCESS ACCUMULATION PROCESS, COMMON MODE SUPPRESSION PROCESS, ANALOG-TO-DIGITAL CONVERSION (ADC) PROCESS AND DECODING PROCESSES ON THE COUPLED SIGNALS, WHEREIN THE COMMON MODE SUPPRESSION PROCESS IS PERFORMED TO ADJUST N ACCUMULATED ANALOG VOLTAGES OBTAINED FROM THE MULTIPLE ACCESS ACCUMULATION PROCESS INTO AN INPUT RANGE OF THE ADC PROCESS — S1

OBTAINING TOUCH LOCATION INFORMATION FOR THE N*M CAPACITIVE NODES BY ACQUIRING TWO CONSECUTIVE FRAMES OF SAID TOUCH RELATED DATA AND PERFORMING A SUBTRACTION OPERATION BETWEEN THE TWO CONSECUTIVE FRAMES OF SAID TOUCH RELATED DATA — S2

TOUCH DETECTION DEVICE, ELECTRONIC APPARATUS AND TOUCH DETECTION METHOD

CROSS-REFERENCE TO RELATED APPLICATION

This application claims the priority of Chinese patent application number 202111266424.9, filed on Oct. 28, 2021, the entire contents of which are incorporated herein by reference.

TECHNICAL FIELD

The present invention relates to the technical field of touch sensing and, more specifically, to a touch detection device, an electronic apparatus and a touch detection method.

BACKGROUND

Currently, capacitive touch sensing is a popular touch sensing technique in intelligent terminals, which employs a capacitive touch sensor for sensing touch events based on sensing changes of capacitance. The capacitive touch sensor is attached to or embedded in a display apparatus (e.g., a liquid crystal display (LCD) or an organic light-emitting diode (OLED) display) and generally includes a drive arrangement and a sense arrangement. The drive arrangement includes a plurality of driving channels and the sense arrangement includes a plurality of sensing channels intersecting the driving channels. The driving channels and sensing channels intersect to form a matrix of capacitive nodes. When the capacitive touch sensor is touched by an electric conductor (e.g., a human body or a stylus), a small amount of charge will transfer to the capacitive node and cause a detectable change of capacitance.

In order to increase touch sensing correctness and accuracy, it is necessary to suppress the influence of noise from a human body or from another circuit and crosstalk from adjacent rows or columns on sensed signals. In a touch detection device, code sequences are utilized to encoded drive signals. Each code sequence corresponds to chips for a respective driving channel, which are loaded into the driving channel at a predetermined time interval. When receiving the resulting coupled signals (voltages or voltage changes across capacitor plates), the coupled signals at the capacitive nodes on individual sensing channels are subject to multiple access accumulation, resulting in multiple accumulated analog voltages superimposed with common-mode components resulting from the chip data for the driving channels, which are then output as detected signals (analog voltage signals) and converted by an analog-digital converter (ADC) into digital voltage signals. The digital voltage signals are then decoded, for example, by calculating inner products of these digital voltage signals associated with the individual sensing channels and the chip sequences for the individual driving channels, as touch related values. At last, a touch location calculation is performed, which involves, for example, outputting the data of the individual sensing channels differentially and integrating and converting the matrix of resulting differential signals back to touch location information of the individual capacitive nodes.

In the above touch detection device, saturation of the accumulated analog voltages resulting from the multiple access accumulation may occur because of exceeding an upper input signal limit of the ADC, leading to degraded touch detection sensitivity. For this reason, common mode suppression (also known as direct current (DC) suppression) of the accumulated analog voltages is often needed before their conversion, in order to adjust them into the ADC's input range. However, since different encoding operations may produce common-mode components of different magnitudes, maintaining the same amount of DC suppression throughout the associated common mode suppression operations may lead to inaccurate decoding and touch detection results and degraded touch sensing sensitivity. Therefore, there is an urgent need in the art for a touch detection device capable of obtaining accurate decoding results of the accumulated encoded signals.

SUMMARY OF THE DISCLOSURE

The present invention provides a touch detection device and method, in which encoding operations are performed on encoded drive signals using code sequences and coupled signals are captured as touch information, without needing to reverse the effect of common mode suppression process. In this way, high touch sensing sensitivity and low circuit power consumption are achievable. The present invention also provides an electronic apparatus including the touch detection device.

In an aspect, the present invention provides a touch detection device for detecting a change of capacitance at n*m capacitive nodes formed by m driving channels and n sensing channels, where both m and n are positive integers. The touch detection device comprises a frame processing module and a touch location calculating module. The frame processing module is configured to, in each encoding operation, load encoded drive signals onto the individual driving channels, capture, through the individual sensing channels, n*m coupled signals produced at the individual capacitive nodes, and acquire one frame of touch related data corresponding to the n*m capacitive nodes by performing multiple access accumulation process, common mode suppression process, ADC process and decoding processes performed on the coupled signals. The common mode suppression process is performed to adjust n accumulated analog voltages obtained from the multiple access accumulation process into an input range of the ADC process. The touch location calculating module is configured to obtain touch location information for the n*m capacitive nodes by acquiring two consecutive frames of said touch related data and performing a subtraction operation between the two consecutive frames of said touch related data.

In another aspect, the present invention provides a touch detection method implemented by a touch sensing chip for detecting a change of capacitance at n*m capacitive nodes formed by m driving channels and n sensing channels, where both m and n are positive integers. The touch detection method comprises:

in each encoding cycle, loading encoded drive signals onto the individual driving channels, capturing, through the individual sensing channels, n*m coupled signals produced at the individual capacitive nodes, and acquiring one frame of touch related data corresponding to the n*m capacitive nodes by performing multiple access accumulation process, common mode suppression, ADC process and decoding processes performed on the coupled signals, wherein the common mode suppression process is performed to adjust n accumulated analog voltages obtained from the multiple access accumulation process into an input range of the ADC process; and obtaining touch location information for the n*m capacitive nodes by acquiring two consecutive frames of said touch related data and performing a subtraction operation between the two consecutive frames of said touch related data.

In a further aspect, the present invention provides an electronic apparatus comprising the above touch detection device.

In the provided touch detection device, the frame processing module acquires each frame of touch related data for the n*m capacitive nodes by generating n*m coupled signals from an encoding process, and then performing multiple access accumulation process, common mode suppression process, ADC process and encoding processes on the coupled signals. The common mode suppression process is performed to adjust n accumulated analog voltages obtained from the multiple access accumulation process into an input range of the ADC process. The touch location calculating module is configured to obtain touch location information for the n*m capacitive nodes by performing a subtraction operation between two consecutive frames of said touch related data. In this way, relative high touch sensing sensitivity can be achieved. In addition, before each single frame of touch related data obtained from the decoding process is subject to subtraction, common-mode analog voltage amounts subtracted in the common mode suppression process may be not added back. This avoids introduction of errors, as well as a larger circuitry area and increased power consumption.

Since the provided touch detection method and electronic apparatus are based on the same concept as the touch detection device, they afford the same advantages thereas.

IN THESE FIGURES 100 denotes a touch detection device; 110, a frame processing module; 120, a touch location calculating module; 111, an encoding unit; 112, an encoding-and-accumulating unit; 113, a common mode suppression unit; 114, an ADC unit; 115, decoding unit; 212, a current source; and 214, an integrator.

DETAILED DESCRIPTION

The touch detection device, electronic apparatus and touch detection method of the present invention will be described in greater detail by way of specific embodiments with reference to the accompanying drawings. Advantages and features of the present invention will become more apparent from the following description. Note that the figures are presented in a very simplified form not necessarily drawn to exact scale and provided merely to facilitate easy and clear description of those embodiments.

Embodiments of the present invention relate to a touch detection device for detecting a change of capacitance at n*m capacitive nodes formed by m driving channels and n sensing channels, where m and n are both positive integers. The touch detection device may be, for example, a touch sensing chip or another apparatus capable of implementing the similar functionality (e.g., a capacitive touch sensor or a touch detection circuit). For example, the driving channels include drive electrodes attached to a display apparatus (e.g., liquid crystal display (LCD) or organic light-emitting diode (OLED) display) or embedded therein, and the sensing channels include sense electrodes disposed in opposition to the respective drive electrodes. The m driving channels may be connected to both a touch sensing driver and an encoding unit so as to be able to apply encoded drive signals to the drive electrodes, which will be coupled to the sense electrodes, resulting in coupled signals on the n sensing channels. Touch detection is achievable through processing the coupled signals.

Figure 1:
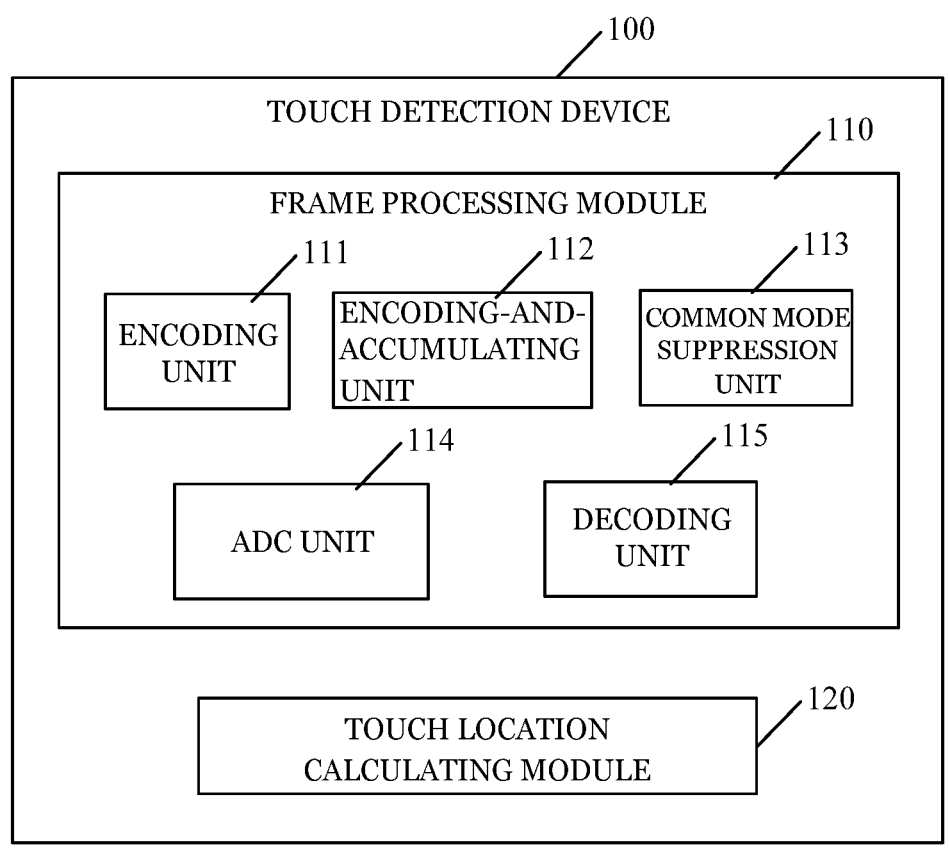
FIG. 1 is a structural schematic of a touch detection device according to an embodiment of the present invention.
Figure 2:
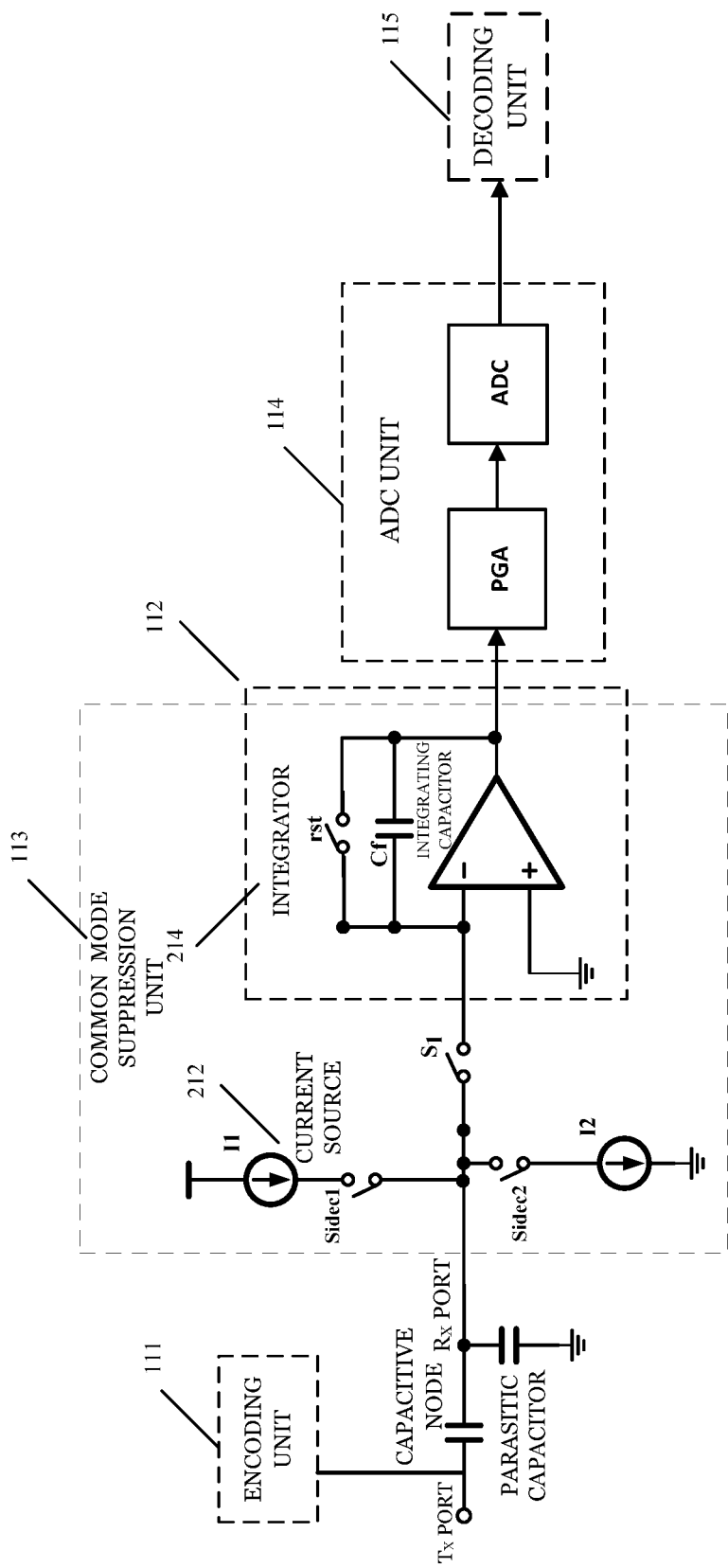
FIG. 2 shows how hardware components in the touch detection device are connected together in accordance with an embodiment of the present invention.

FIG. 1 is a structural schematic of the touch detection device according to an embodiment of the present invention. FIG. 2 shows how hardware components in the touch detection device are connected together according to an embodiment of the present invention. Referring to FIGS. 1 and 2, the touch detection device 100 includes a frame processing module 110 and a touch location calculating module 120. The frame processing module 110 is configured to, in each encoding cycle, load encoded drive signals onto the individual driving channels and to capture the resulting n*m coupled signals from the individual capacitive nodes through the individual sensing channels. The captured coupled signals are then subject to a series of processes including multiple access accumulation, common mode suppression, analog-to-digital conversion (ADC) and decoding, resulting in a frame of touch related data corresponding to the n*m capacitive nodes. The common mode suppression process is to adjust n accumulated analog voltages obtained from the multiple access accumulation process into an input range for the ADC process. The touch location calculating module 120 is configured to carry out a subtraction operation between two consecutive frames of touch related data and thereby obtain touch location information for the n*m capacitive nodes.

Figure 3:
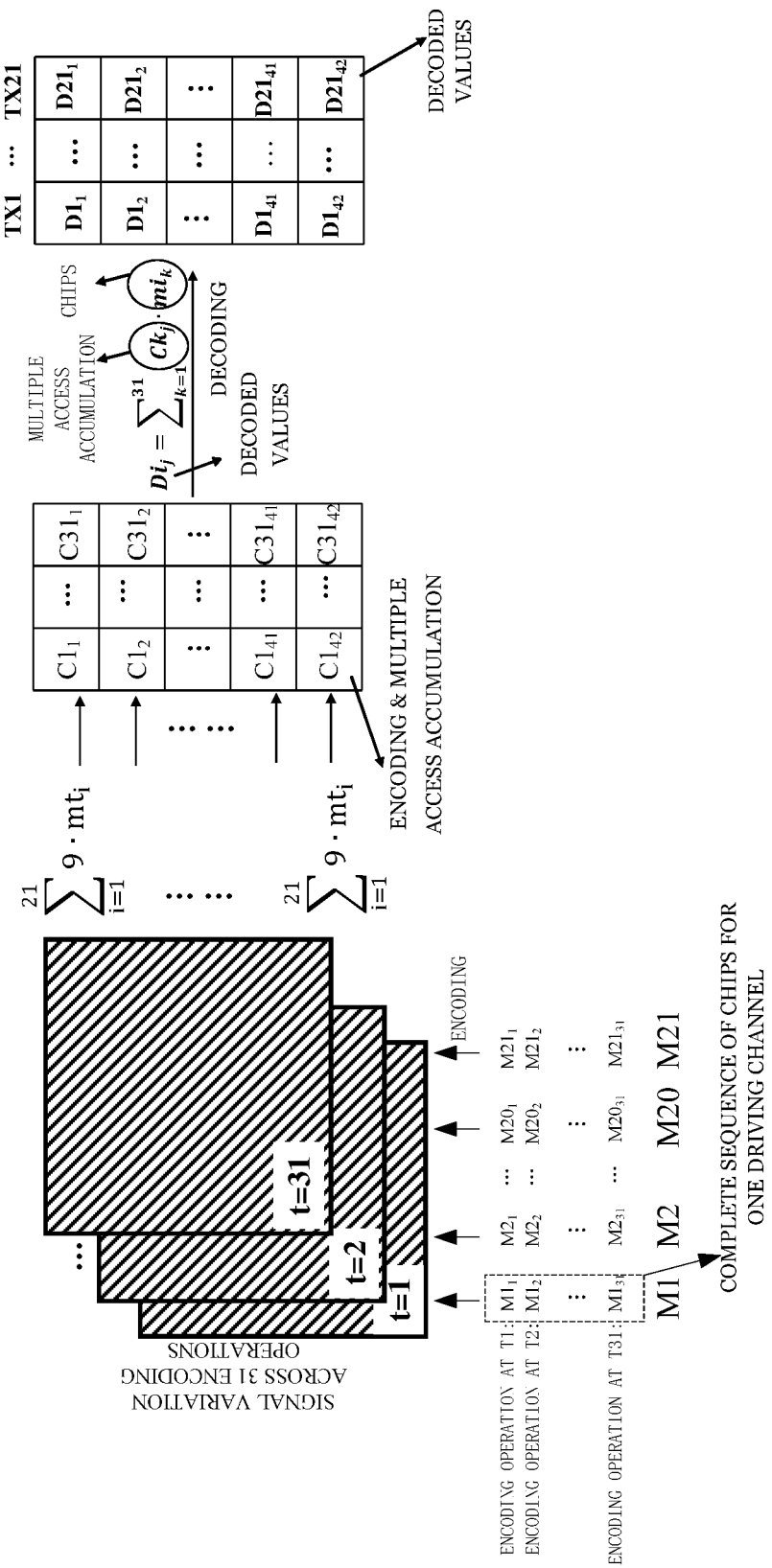
FIG. 3 is a schematic view showing encoding, multiple access accumulation and decoding processes performed by a frame processing module according to an embodiment of the present invention.

FIG. 3 is a schematic view showing the encoding, multiple access accumulation and decoding processes performed by the frame processing module according to an embodiment of the present invention. Below, reference will be made to FIGS. 1 to 3 to describe the structure of the frame processing module 110 and the encoding process, multiple access accumulation process, common mode suppression process, ADC process and decoding processes performed by the frame processing module 110 on a predetermine number of driving channels and a predetermine number of sensing channels, as an example, according to particular embodiments of the present invention.

The frame processing module 110 may include an encoding unit 111 configured to produce chips to be applied to the m driving channels (denoted as "Tx") and generate m encoded drive signals from the respective chips, in each encoding operation. As an example, there may be 21 driving channels (i.e., m=21) and 42 sensing channels ("Rx") (i.e., n=42). The encoding unit 111 may use an M code to encode the individual driving channels. However, the present invention is not so limited, because according to embodiments of the present invention, the codes for encoding the driving channels may be of any of various pseudorandom noise (PN) codes or orthogonal codes, such as a Walsh code. In case of an M code usually with a codeword length of ($2^y-1$) bits (where y is a positive integer) being used as an example, since encoding the 21 driving channels requires the use of 21 M-code codewords, for instance, if a 31-bit M-code with 31 codewords is used, the encoding process may be accomplished by encoding all the channels in only a single run (each channel is encoded totally for 31 times); or if a 15-bit M-code with 15 codewords is used, the task can be accomplished by encoding the 21 channels in two separate runs (e.g., Channel Nos. 1 to 15 are encoded with all the 15 codewords in the first run (each channel is encoded totally for 15 times), and Channel Nos. 16 to 21 are encoded with 5 codewords selected from the 15 codewords in the second run (each channel is also encoded totally for 15 times)). The following description is given in the context of an M code with a codeword length of 31 bits being used as an example (all the channels are encoded in only one run).

Referring to FIG. 3, during the encoding process of the frame processing module 110, each channel is encoded at 31 instants of time t1, t2, . . . t31. The $1^{st}$ to $21^{st}$ driving channels are encoded with a chip vector $m1_1, m2_1, \ldots, m21_1$ at t1; $m1_2, m2_2, \ldots, m21_2$ at t2; . . . ; and $m1_{31}, m2_{31}, \ldots, m21_{31}$ at t31. Each element in the chip vectors (e.g., $m21_{31}$) takes the value of 1 or −1. As a result, the 21 driving channels are encoded with respective complete chip sequences of 31 vectors, M1, M2, . . . , M20, M21. For instance, the first driving channel (Tx1) is encoded with the chip sequence M1=($m1_1, m1_2, \ldots, m1_{31}$). In this way, through loading the encoding data onto the driving channels, drive signals applied to the respective driving channels are encoded with the chip sequences. As a result of each encoding operation performed at a certain instant of time, encoded drive signals in the form of a combination of chip vector elements loaded onto the m driving channels (m=21) are applied to the drive electrodes. For example, m encoded drive signals ($m1_1, m2_1, \ldots, m21_1$) are applied at t1, ($m1_2, m2_2, \ldots, m21_2$) at t2, ($m1_{31}, m2_{31}, \ldots, m21_{31}$) at t31.

Coupled data resulting from capacitive coupling is captured at ports of the n sensing channels (Rx ports) and then subject to multiple access accumulation process. The frame processing module 110 may include an encoding-and-accumulating unit 112 configured to capture, through the individual sensing channels, the n*m coupled signals produced by the m driving channels at the individual capacitive nodes, and to obtain n accumulated analog voltages through performing multiple access accumulation operations on the coupled signals at the m capacitive nodes of each of the n sensing channels and the m encoded drive signals (m=21) in each encoding operation. For example, the encoding of the channel Rx1 at t1 may involve an MAC operation performed of the 21 coupled signals corresponding to Rx1 and the encoded drive signals ($m1_1, m2_1, \ldots, m21_1$) at t1. In each encoding operation of the m driving channels, the sum of the encoded chip vector elements is identified as a common-mode component for the specific encoding operation.

Specifically, referring to FIG. 3, prior to the multiple access accumulation operations by the frame processing module 110, the n*m coupled signals produced by the m driving channels at the individual capacitive nodes may be acquired through the individual sensing channels, and coupled voltage data at the m capacitive nodes of each of the n sensing channels may be encoded and accumulated. For example, the coupled voltage signals captured by the sensing channels may be 9V, and in this case, if the chip vector element for a certain encoding operation performed on the i-th driving channel (i=1, 2, . . . , or 21) is denoted as $mt_i$, then a result of a multiple access accumulation operation of the 21 capacitive nodes on a single sensing channel may be expressed as $$\sum_{i=1}^{21} 9 \cdot mt_i.$$

Therefore, 42 accumulated analog voltages (n=42) will be obtained from the 42 sensing channels (n=42) in each encoding operation, and a dataset of 42 rows and 31 columns in the totally 31 encoding operations, in which data of the first row represents the results of multiple access accumulation operations for the 21 capacitive nodes on the first sensing channel (Rx1) in the encoding operations performed at the instants of time t1, t2, t31, which are denoted as $C1_1, C2_1, \ldots, C31_1$; data of the second row represents the results of multiple access accumulation operations for the 21 capacitive nodes on the second sensing channel (Rx2) in the encoding operations performed at the instants of time t1, t2, t31, which are denoted as $C1_2, C2_2, \ldots, C31_2$; and so forth. For the sake of brevity, the matrix resulting from the multiple access accumulation process (i.e., the 42-row 31-column matrix in this example) is referred hereinafter as an "encoded accumulated matrix". The number of rows of the encoded accumulated matrix is equal to the number of the sensing channels (i.e., n), and the number of columns of the matrix is equal to k (a positive integer), which is also the number of encoding operations performed in the encoding process. In other words, the encoded accumulated matrix is an n*k (n-row k-column) matrix. Data of each column corresponds to the 42 accumulated analog voltages (n=42) obtained from the 42 sensing channels (n=42) in a corresponding encoding operation. More specifically, data of the first column represents the results of multiple access accumulation operations of the 21 capacitive nodes (m=21) on each of the 42 sensing channels (Rx1-Rx42) and the encoded drive signals at the instant t1, which are denoted as $C1_1, C1_2, \ldots, C1_{42}$; data of the second column represents the results of multiple access accumulation operations of the 21 capacitive nodes (m=21) on each of the 42 sensing channels (Rx1-Rx42) and the encoded drive signals at the instant t2, which are denoted as $C2_1, C2_2, \ldots, C2_{42}$; and so forth.

Subsequent to the multiple access accumulation process, in order to avoid any of the analog voltage signals to be subjected to ADC from exceeding a permissible input range of the ADC unit 114, which may lead to oversaturation of the analog voltage signal and degraded touch sensing sensitivity, the frame processing module 110 may be further configured to process the accumulated analog voltages, i.e., the elements of the encoded accumulated matrix, so that if any of the accumulated analog voltages exceeds a predetermined range (determined according to the permissible input range of the ADC unit 114), the voltage is adjusted into the input range. This is called a common mode suppression (or DC suppression) process.

Specifically, the frame processing module 110 may include a common mode suppression unit 113 configured to generate n analog voltage signals to be decoded through processing the n accumulated analog voltages from the encoding-and-accumulating unit 112 by subtracting, from these accumulated analog voltages, respectively the common-mode analog voltage amounts beyond the permissible input range of the ADC unit 114.

Referring to FIG. 2, in one embodiment, the common mode suppression unit 113 of FIG. 1 may include at least one current source 212 arranged at an output node of each sensing channel, which is configured to subtract the surplus common-mode analog voltage amount beyond or exceeding the predetermined range from a respective one of the n accumulated analog voltages and thus adjust them into the permissible input range of the ADC stage through drawing or injecting a current (its direction is indicated by I1 or I2 in FIG. 2). The common mode suppression unit 113 may vary the DC suppression amount through adjusting the magnitude of the current i drawn or injected by the current source 212 in accordance with the voltage-capacitance relationship given by V=i*t/C (where V represents the common-mode analog voltage amount to be subtracted from the respective accumulated analog voltage, i is the current, t is the time, and C is the capacitance of an associated integrating capacitor). The n*k DC suppression amounts constitute an n*k (n-row k-column) common mode suppression matrix (or DC suppression matrix) for processing the individual elements of the aforementioned (n-row k-column) encoded accumulated matrix, i.e., the individual accumulated analog voltages, by subtracting from them the respective surplus analog voltage amounts over the predetermined range. In one embodiment, each column of the DC suppression matrix may maintain the same numerical value across the individual rows. These values of the individual columns are called "common-mode analog voltage amounts" and each "common-mode analog voltage amount" depends on the common-mode components in the respective encoding operations (i.e., the sums of chip vector elements applied onto the m driving channels at the respective encoding instants of time). In other embodiments, each column of the DC suppression matrix may maintain different numerical values across the individual rows. This is because when a touch event occurs on one of the sensing channels, it may lead to smaller response values from some rows when compared to those from the other rows in each column. However, as further detailed below, whether the rows in each column of the DC suppression matrix keep the same value or not has no impact on the differential values between decoded consecutive frames.

The common mode suppression unit 113 may further include an integrator 214 as shown in FIG. 2, which may integrate charges resulting from the current source of FIG. 2, thus resulting in the analog voltage signals to be decoded. Notably, in one hardware implementation of the touch detection device according to embodiments of the present invention, the integrator 214 may be further configured to implement the aforementioned multiple access accumulation process of the encoding-and-accumulating unit 112 shown in FIG. 1. That is, it may be further configured to perform both part of the functionality of the common mode suppression unit 113 and the functionality of the encoding-and-accumulating unit 112. In this embodiment, the integrator 114 is configured to integrate charges at the respective output nodes of the n sensing channels, generate the n analog voltage signals to be decoded that are within the predetermined range, and input these signals to the ADC unit 114. In another embodiment, the charges at the respective output nodes of the n sensing channels may be integrated separately by individual integrators, thus resulting in the n analog voltage signals to be decoded that are within the predetermined range, which are then input to the ADC unit 114.

A switch (S1) may be disposed between the current source 212 and the integrator 214, and the integrator 214 may include an operational amplifier. The operational amplifier may include a grounded first input, a second input connected to an output of the current source 212 (at one end of S1) and an integrating capacitor (Cf) disposed between the second input of the operational amplifier and the output node of the current source 212. The integrator 214 may include another switch (rst) arranged between the second input of the operational amplifier and an output thereof. A surplus amount beyond the predetermined range may be subtracted from an analog voltage as a result of the current source 212 drawing (reducing an amount of charge) or injecting (adding an amount of charge) a current. Specifically, the amount of charge may be reduced from or added to the integrating capacitor in the integrator 214, which results in a change in the output voltage of the integrator 214, thus accomplishing the common mode suppression task. More specifically, each analog voltage signal to be decoded output from the integrator 214 may be calculated according to:

$$\Delta Vout = -N*\Delta Vin*Cm/Cf + d*Qdc/Cf,$$

where, N is the common-mode component in the respective encoding operation (i.e., the sum of the chip vector elements applied to the m driving channels at the respective encoding instants of time), ΔVin is the coupled voltage signal (e.g., 9V) at the m capacitive nodes on the respective sensing channel, Cm is the capacitance of said capacitive nodes, Cf is the capacitance of the integrating capacitor in the integrator 214, d is the DC suppression amount and Qdc is a unit of charge. As can be seen from the above equation, the value of d (i.e., the DC suppression amount) varies depending on the value of N (i.e., the encoded common-mode component), thus ensuring that the analog voltage signal ΔVout to be decoded output from the integrator 214 is adjusted into the operating range of the ADC unit 114.

Referring to FIGS. 1 and 2, the frame processing module 110 may include the ADC unit 114, which is configured to convert the analog voltages within the predetermined range into their digital signals. That is, the n analog voltage signals to be decoded are converted into n digital voltage signals to be decoded. The ADC unit 114 has a predetermined input voltage range. When all the n analog voltage signals to be decoded input to the ADC unit 114 are within the input voltage range, they can be properly converted into the n digital voltage signals to be decoded within a corresponding range. The ADC unit 114 may employ any structure known in the art.

Referring to FIG. 2, the ADC unit 114 may include, for example, a programmable gain amplifier (PGA) and a component (ADC) for converting the analog signals into the digital signals. Since the analog voltage signals to be decoded input to the ADC unit 114 have been subjected to the common mode suppression process so as to be adjusted into the input range of the ADC unit 114, oversaturation of these voltage signals is avoid, which may lead to degraded touch sensing sensitivity. Touch related value of the individual capacitive nodes can be obtained by decoding the 42 (n=42) digital voltage signals to be decoded output from the ADC unit 114. Specifically, continuing the above example, a 42-row 31-column matrix of digital signals to be decoded is obtained by performing the common mode suppression and ADC processes on the 42-row 31-column dataset resulting from the 31 encoding operations (k=31) (i.e., the n-row k-column encoded accumulated matrix, where k represents the number of encoding operations). Each element of the obtained matrix is a digital voltage signal to be decoded resulting from the common mode suppression process and ADC process performed on a respective element of the matrix of analog voltages.

Referring to FIGS. 1 and 2, the frame processing module 110 may include a decoding unit 115 configured to decode the n (e.g., n=42) digital voltage signals based on the chips on the m (e.g., m=21) driving channels to generate touch related value for the aforementioned n*m capacitive nodes. The 42-row 31-column (n*k, n=42, k=31) matrix of digital signals obtained by performing common mode suppression and ADC processes on the encoded accumulated matrix of FIG. 3 resulting from 31 multiple access accumulation process (k=31) is decoded by calculating inner products of individual rows of the 42-row 31-column (n*k, n=42, k=31) matrix of digital signals and chip sequences for the 21 driving channels (m=21) (i.e., k*m chip vector elements) as touch related value for the capacitive nodes on the individual sensing channels. Referring to FIG. 3, decoded data for the i-th driving channel (i=1, 2, . . . , or 21) and j-th sensing channel (j=1, 2, . . . , or 42) may be expressed as $$Di_j = \sum_{k=1}^{31} Ck_j \cdot mi_k,$$

where k represents the number of encoding operations.

In order to more clearly describe the above processes from encoding to decoding, a simple example with 2 driving channels (m=2) and 4 sensing channels (n=4) is set forth below. In this example, voltage data applied to the driving channels Tx may be expressed as $$\begin{pmatrix} 9 & 9 \\ 9 & 9 \\ 9 & 9 \\ 9 & 9 \end{pmatrix},$$

where the two columns of data correspond to the respective two driving channels. For example, totally 3 encoding operations (k=3) are performed with a chip vector (1, 1, −1) for the driving channel corresponding to the left column of voltages and a chip vector (−1, 1, 1) for the driving channel corresponding to the right column of voltages, where each "1" corresponds to a rising edge from −3 V to 6 V, i.e., an encoding datum indicating a voltage change of 9 V, and each "−1" corresponds to a falling edge from 9 V to −3 V, i.e., an encoding datum indicating a voltage change of −9V. On the Rx side (sensing channels) Rx, the above-described multiple access accumulation process is first carried out, resulting in the 4-row 3-column dataset $$\begin{pmatrix} 0 & 18 & 0 \\ 0 & 18 & 0 \\ 0 & 18 & 0 \\ 0 & 18 & 0 \end{pmatrix},$$

where the left, middle and right columns represent accumulated values in the respective three encoding operations (9−9=0 at t1; 9+9=18 at t2; and −9+9=0 at t3). After that, the data is subsequent to common mode suppression and ADC, and is decoded by calculating inner products of the accumulated vectors and the chip vectors. For example, the inner product of (0, 18, 0) and (1, 1, −1), i.e., 0*1+18*1+0*(−1)= 18, is calculated as a decoded datum for the coupling between the first sensing channel and the driving channel corresponding to the left column of voltages. In this way, the 4-row 2-column decoded dataset $$\begin{pmatrix} 18 & 18 \\ 18 & 18 \\ 18 & 18 \\ 18 & 18 \end{pmatrix}$$

is obtained.

For each frame of data, the frame processing module 110 can obtain one frame of touch related data corresponding to the n*m capacitive nodes by performing the above described encoding process, multiple access accumulation process, common mode suppression process and ADC process. Each frame of touch related data may be represented by an n*m matrix, in which each row corresponds to one of the sensing channels, and each column corresponds to one of the driving channels. Moreover, the elements at intersections of the individual rows and columns represent touch related values for the respective capacitive nodes at the physical intersections of the corresponding sensing and driving channels.

In the aforementioned common mode suppression process, as the common-mode analog voltage amounts subtracted in each of the k encoding operations depends on the common-mode component accumulated in each encoding operation (i.e., the sum of chip vector elements loaded on the m driving channels), the common-mode analog voltage amounts subtracted in the individual encoding operations may differ from one another. Before the digital voltage signals from the ADC converter are decoded, it is often necessary to reverse the effect of the common mode suppression process (i.e., adding back the subtracted amounts). Since analog amounts are subtracted in the common mode suppression process prior to the ADC process and need to be added back after the ADC process, the reversing may involve computationally converting the subtracted common-mode analog voltage amounts into digital amounts and adding the converted digital amounts to the digital voltage signals from the ADC converter. In one embodiment of the present invention, the touch location information for the n*m capacitive nodes may be obtained by further processing each single frame of touch related data. For example, data from the various sensing channels are output in a differential manner, and the resulting matrix of differential signals is integrated to derive the touch location information for the n*m capacitive nodes. Moreover, in this technique, if the obtainment of each single frame of touch related data involve a common mode suppression process, then prior to obtaining touch location information for the n*m capacitive nodes by processing the frame of touch related data, it is necessary to convert analog voltage amounts subtracted in the common mode suppression process into corresponding digital voltage amounts and add them back to the resulting frame of touch related data. However, we have found in our research that the common mode suppression and reversing processes are associated with the following problems. First, the digital amounts added in the reversing process and the digital voltage signals resulting from the ADC conversion may have significant errors, which may lead to inaccurate recovered digital voltage signals and thus degraded touch sensing sensitivity. In addition, the reversing process requires additionally arranging adding or subtracting elements between the ADC converter and the decoding unit for conducting massive multi-bit logic operations, leading to a larger circuitry area and increased power consumption. In order to avoid introducing errors or increases in circuitry area and power consumption during the reversing process, according to another embodiment of the present invention, the touch detection device obtains touch location information for the n*m capacitive nodes by operating on a pair of frames of touch related data rather than on the individual single frames of data.

Specifically, referring to FIG. 1, according to embodiments of the present invention, the touch detection device includes the touch location calculating module 120, which is configured to acquire two consecutive frames of the above-described touch related data and perform a subtraction operation between them. Specifically, the differences between the elements in one frame of touch related data and the respective elements in the other frame of touch related data are calculated as the touch location information for the respective capacitive nodes. That is, the touch location information for the n*m capacitive nodes are obtained by performing a subtraction operation between two consecutive frames of touch related data in the form of n*m matrices. The touch location calculating module 120 may be implemented in hardware circuitry or software. For example, according to one embodiment, the touch location calculating module 120 includes a processor running software for performing a subtraction operation between two consecutive frames of touch related data. Notably, in some embodiments, the consecutive frames may be a frame associated with a touch event and a frame not associated with a touch event. However, in alternative embodiments, the consecutive frames may be both associated with touch events.

Preferably, the two consecutive frames of touch related data that is subject to the subtraction operation of the touch location calculating module 120 has not undergone reversing processes for adding back the analog voltage amounts subtracted in the common mode suppression processes. That is, before the touch location calculating module performs the subtraction operation between the consecutive frames of touch related data, each frame of touch related data has not been recovered by adding back the common-mode analog voltage amounts that were subtracted in the common mode suppression process. Experiments have shown that, for the Rx side, the approach without reversing the effect of common mode suppression according to the present invention (in which, for the consecutive frames of touch related data, after their respective encoded accumulated matrices are subjected to common mode suppression and ADC and thus converted into the respective digital representations, the resulting digital matrices are directly decoded without adding back the subtracted common-mode analog voltage amounts to produce the two frames which are subsequently subject to a subtraction operation for calculating their differences) results in the same signal distributions as the approach in which frames of data are directly derived from analog voltage signals captured at the individual voltage nodes on the sensing channels (without experiencing multiple access accumulation) and differences between every two consecutive frames, indicating that the approach without reversing the effect of common mode suppression according to the present invention does not have any adverse impact on touch sensing sensitivity. In addition, dispensing with the reversing processes can avoid errors introduced during the processes and thus ensure good touch sensing sensitivity. Further, since it is not needed to arrange a reversing module in the readout circuitry, a relatively small circuitry area and low power consumption can be achieved.

Figure 4:
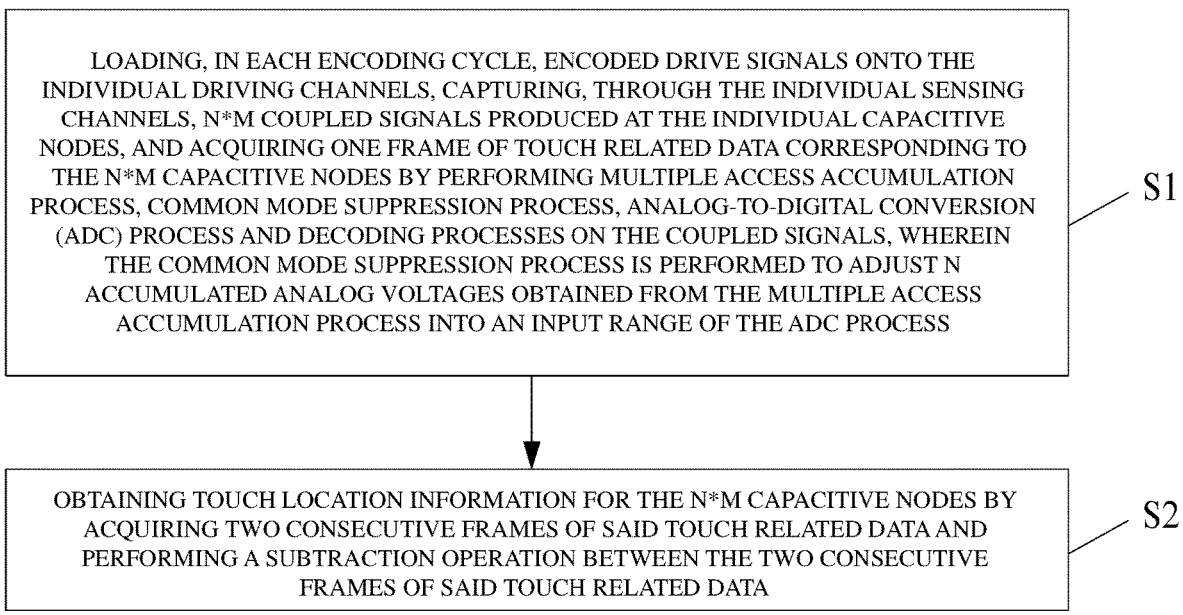
FIG. 4 is a flowchart of a touch detection method according to an embodiment of the present invention.

Embodiments of the present invention also relate to touch detection method for detecting a change of capacitance at n*m capacitive nodes formed by m driving channels and n sensing channels, where both m and n are positive integers. The touch detection method is implemented by a touch sensing chip. The touch sensing chip may include, for example, a digital voltage signal processing (DSP) module or a micro controller unit (MCU) for carrying out the touch detection method. FIG. 4 is a flowchart of the touch detection method according to an embodiment of the present invention. Referring to FIG. 4, the touch detection method essentially comprises the following first and second steps.

In the first step S1, in each encoding cycle, encoded drive signals are loaded onto the individual driving channels, and n*m coupled signals produced at the individual capacitive nodes are captured through the individual sensing channels, followed by acquiring one frame of touch related data corresponding to the n*m capacitive nodes by performing multiple access accumulation process, common mode suppression process, ADC process and decoding process on the coupled signals. The common mode suppression process is performed to adjust n accumulated analog voltages obtained from the multiple access accumulation process into an input range of the ADC process.

In the second step S2, touch location information for the n*m capacitive nodes is obtained by acquiring two consecutive frames of the touch related data and performing a subtraction operation between the two consecutive frames of the touch related data.

Since the touch detection method is based on the same concept as the above described touch detection device, the foregoing description of the touch detection device applies to the touch detection method. In preferred embodiments of the touch detection method, before any two consecutive frames of touch related data are subject to a subtraction operation, analog voltage amounts subtracted in the common mode suppression process are not added back for each frame of touch related data in order to avoid introducing errors and thus ensure relatively high touch sensing sensitivity. Moreover, since it is not needed to arrange a reversing module in the readout circuitry, a relatively small circuitry area and low power consumption can be achieved. Specific experimental data is set forth below to explain why the approach without reversing the effect of common mode suppression according to the present invention does not have any adverse impact on touch sensing sensitivity.

As an example, assuming m=4, n=4, k=4, i.e., touch location information for 16 capacitive nodes formed by 4 driving channels (denoted as Tx1, Tx2, Tx3, Tx4) and 4 sensing channels (denoted as Rx1, Rx2, Rx3, Rx4) are analyzed by performing 4 encoding operations. Chip data used in the 4 encoding operations (i.e., an encoding matrix) is given in the table below.

|  | t1 | t2 | t3 | t4 |
|---|---|---|---|---|
| Tx1 | 1 | 1 | 1 | 1 |
| Tx2 | −1 | 1 | −1 | 1 |
| Tx3 | −1 | 1 | 1 | −1 |
| Tx4 | −1 | −1 | 1 | 1 |

In this m*k (m-row k-column, 4*4 in this example) encoding matrix, each row represents chip data for a respective one of the driving channels, and each complete piece of chip data is used to encode drive signals at instants of time t1, t2, t3, t4 on the respective driving channel. Each of the encoding operations is performed at a respective one of the 4 instants of time and involving applying chip vector elements to the respective 4 driving channels, the sum of which is identified as a common-mode component for the specific encoding operation. Thus, for the above encoding matrix, the common-mode components for the 4 encoding operations performed at t1, t2, t3, t4 are −2, 2, 2, 2, respectively. Each of the common-mode analog voltage amounts subtracted in the common mode suppression process depends on those common-mode components. As can be seen, for the above encoding matrix, the common-mode components for the respective columns (corresponding to the respective instants of encoding time) may be different.

Analog voltages generated on the individual touch capacitors at the respective capacitive nodes in response to the 4 encoding operations (k=4, i.e., it is assumed that 4 encoding operations are performed in one complete encoding cycle) performed on the driving channels using the above encoding matrix are captured through the individual sensing channels on the Rx side as a frame of n*m (n-row m-column, 4*4 in this example) touch related data. This frame is initial touch sense data, and differences between two consecutive frames of such initial touch sense data reflect variations in and thus a distribution of touch sense signals. Here, a frame of initial touch sense data is captured under a condition where no touch event has occurred as a non-encoded initial data matrix 1, and a frame of initial touch sense data is captured under a condition where a touch event has occurred as a non-encoded initial data matrix 2. In each of these matrices, the individual rows represent the respective sensing channels, and the individual columns represent the respective driving channels, as shown in the table below. It is noted that as described in the embodiment of FIG. 3, while the coupled voltage signals captured through the sensing channels have all been 9 V, the touch detection method of the present invention is not limited to the n*m initial touch sense values being the same. As an example, in the non-encoded initial data matrices 1 and 2, the coupled analog voltages signals on the individual touch capacitors at the respective capacitive nodes are shown as different values.

(Non-Encoded Initial Data Matrix 1)

|  | Tx1 | Tx2 | Tx3 | Tx4 |
|---|---|---|---|---|
| Rx1 | 1.290026 | 1.145737 | 1.123666 | 1.051511 |
| Rx2 | 0.813009 | 0.980054 | 1.025916 | 1.077026 |
| Rx3 | 1.134283 | 1.270046 | 1.101957 | 0.89023 |
| Rx4 | 0.897544 | 1.18707 | 1.198424 | 1.004775 |

(Non-Encoded Initial Data Matrix 2)

|  | Tx1 | Tx2 | Tx3 | Tx4 |
|---|---|---|---|---|
| Rx1 | 1.290026 | 1.145737 | 1.123666 | 1.051511 |
| Rx2 | 0.813009 | 0.880054 | 0.925916 | 1.077026 |
| Rx3 | 1.134283 | 1.170046 | 1.001957 | 0.89023 |
| Rx4 | 0.897544 | 1.18707 | 1.198424 | 1.004775 |

The non-encoded initial data matrices 1 and 2 are then subject to the aforementioned multiple access accumulation process. For each of the matrices, multiple access accumulation operations rare carried out on coupled signals on the 4 capacitive nodes (m=4) on each of the 4 sensing channels (n=4) (R1, R2, R3, R4) and the 4 encoded drive signals (m=4) loaded in each encoding operation (i.e., the individual columns of the encoding matrix, which are respectively loaded at t1 to t4), resulting in 4 accumulated analog voltages (n=4) for a corresponding column of an encoded accumulated matrix. Thus, multiple access accumulation processes carried out in the 4 encoding operations at t1 to t4 result in values for the 4 columns of the encoded accumulated matrix. In this way, the encoded accumulated matrices 1 and 2 for the conditions with and without a touch event having occurred are obtained as shown below. In the encoded accumulated matrix 1, the elements in the first column are obtained from a multiply-accumulate (MAC) operation performed on Rx data in a corresponding row of the non-encoded initial data matrix 1 and Tx chips loaded at the instant t1 (i.e., a corresponding column of the above encoding matrix). In the encoded accumulated matrix 2, the elements in the first column are obtained from a multiply-accumulate (MAC) operation performed on Rx data in a corresponding row of the non-encoded initial data matrix 2 and Tx chips loaded at the instant t1 (i.e., a corresponding column of the above encoding matrix). In each of the encoded accumulated matrices 1 and 2, the individual rows represent the respective sensing channels, and the individual columns represent the respective encoding instants of time. Moreover, each element of these matrices is an accumulated analog voltage resulting from a multiple access accumulation operation. Therefore, both the encoded accumulated matrices are n*k (n-row k-column, 4*4 in this example) matrices.

(Encoded Initial Data Matrix 1)

|  | t1 | t2 | t3 | t4 |
|---|---|---|---|---|
| Rx1 | −2.03089 | 2.507919 | 2.319467 | 2.363608 |
| Rx2 | −2.26999 | 1.741953 | 1.935898 | 1.844173 |
| Rx3 | −2.12795 | 2.616055 | 1.856425 | 2.192602 |
| Rx4 | −2.49273 | 2.278262 | 1.913673 | 1.890964 |

(Encoded Initial Data Matrix 2)

|  | t1 | t2 | t3 | t4 |
|---|---|---|---|---|
| Rx1 | −2.03089 | 2.507919 | 2.319467 | 2.363608 |
| Rx2 | −2.06999 | 1.541953 | 1.935898 | 1.844173 |
| Rx3 | −1.92795 | 2.416055 | 1.856425 | 2.192602 |
| Rx4 | −2.49273 | 2.278262 | 1.913673 | 1.890964 |

After that, the encoded accumulated matrices 1 and 2 are subject to a common mode suppression process using the common mode suppression matrix below as an example. As previously descried, common mode suppression can be accomplished by injecting or drawing a current to or from an integrating capacitor. Therefore, the elements in the common mode suppression matrix may be common-mode analog voltage amounts, which are to be subtracted by the common mode suppression unit 113 in accordance with i*t=C*V by injecting or drawing respective currents i. The elements of the common mode suppression matrix depend on the common-mode components of the chips. For example, in the above encoding matrix, the common-mode components of the 4 encoding operations performed at t1, t2, t3, t4 are −2, 2, 2 and 2, respectively. Therefore, the DC suppression amounts of the individual rows in each column of the common mode suppression matrix are theoretically equal. However, since response values from capacitive nodes on some rows in each column may be slightly lower when a touch event occurs on one of the sensing channels, the DC suppression amounts of the individual rows in each column of the common mode suppression matrix may be different.

(Common Mode Suppression Matrix)

|  | t1 | t2 | t3 | t4 |
|---|---|---|---|---|
| Rx1 | 0.6 | −1.2 | −0.9 | −0.9 |
| Rx2 | 0.8 | −0.3 | −0.5 | −0.4 |
| Rx3 | 0.7 | −1.3 | −0.4 | −0.8 |
| Rx4 | 1.2 | −0.8 | −0.5 | −0.5 |

As a result of the common mode suppression process using the above common mode suppression matrix, a common mode suppressed encoded matrix 1 is obtained from the encoded accumulated matrix 1, and a common mode suppressed encoded matrix 2 is obtained from the encoded accumulated matrix 2. These common mode suppressed encoded matrices are given below.

(Common Mode Suppressed Encoded Matrix 1)

|  | t1 | t2 | t3 | t4 |
|---|---|---|---|---|
| Rx1 | −1.43089 | 1.307919 | 1.419467 | 1.463608 |
| Rx2 | −1.46999 | 1.441953 | 1.435898 | 1.444173 |
| Rx3 | −1.42795 | 1.316055 | 1.456425 | 1.392602 |
| Rx4 | −1.29273 | 1.478262 | 1.413673 | 1.390964 |

(Common Mode Suppressed Encoded Matrix 2)

|  | t1 | t2 | t3 | t4 |
|---|---|---|---|---|
| Rx1 | −1.43089 | 1.307919 | 1.419467 | 1.463608 |
| Rx2 | −1.26999 | 1.241953 | 1.435898 | 1.444173 |
| Rx3 | −1.22795 | 1.116055 | 1.456425 | 1.392602 |
| Rx4 | −1.29273 | 1.478262 | 1.413673 | 1.390964 |

Subsequently, the common mode suppressed encoded matrices 1 and 2 are decoded using the above encoding matrix. In this example, this is accomplished by calculating inner products of data of the individual rows and chip vector elements of the individual driving channels. Similar to the encoded accumulated matrices, the common mode suppressed encoding matrices 1 and 2 are both n*k (n-row k-column, 4*4 in this example) matrices. The decoding of each common mode suppressed encoded matrix involves an MAC operation performed on the n*k digital voltage signals thereof and the k*m chip elements loaded on the driving channels (i.e., a k-row m-column matrix formed by the chip sequences for the m driving channels). A decoded matrix 1 results from the decoding of the common mode suppressed encoded matrix 1, and a decoded matrix 2 results from the decoding of the common mode suppressed encoded matrix 2.

(Decoded Matrix 1)

|  | Tx1 | Tx2 | Tx3 | Tx4 |
|---|---|---|---|---|
| Rx1 | 0.690026 | 0.695737 | 0.673666 | 0.751511 |
| Rx2 | 0.713009 | 0.730054 | 0.725916 | 0.727026 |
| Rx3 | 0.684283 | 0.670046 | 0.701957 | 0.74023 |
| Rx4 | 0.747544 | 0.68707 | 0.698424 | 0.654775 |

(Decoded Matrix 2)

|  | Tx1 | Tx2 | Tx3 | Tx4 |
|---|---|---|---|---|
| Rx1 | 0.690026 | 0.695737 | 0.673666 | 0.751511 |
| Rx2 | 0.713009 | 0.630054 | 0.625916 | 0.727026 |
| Rx3 | 0.684283 | 0.570046 | 0.601957 | 0.74023 |
| Rx4 | 0.747544 | 0.68707 | 0.698424 | 0.654775 |

The decoded matrices 1 and 2 are two frames of touch related data corresponding to the above non-encoded initial data matrices 1 and 2, respectively. According to the method of the present invention, a subtraction process is carried out between the decoded matrices 1 and 2, resulting in touch location information for the 4*4 capacitive nodes in the form of the following encoded differential matrix.

(Encoded Differential Matrix)

|  | Tx1 | Tx2 | Tx3 | Tx4 |
|---|---|---|---|---|
| Rx1 | 0 | 0 | 0 | 0 |
| Rx2 | −2.22E−16 | 0.1 | 0.1 | 0 |
| Rx3 | 2.22E−16 | 0.1 | 0.1 | −2.22E−16 |
| Rx4 | 0 | 0 | 0 | 0 |

In order to verify whether the touch location information reflected in this differential matrix is accurate, a subtraction operation is also performed between the aforementioned non-encoded initial data matrices 1 and 2, resulting in the following non-encoded initial differential matrix.

(Non-Encoded Initial Differential Matrix)

|  | Tx1 | Tx2 | Tx3 | Tx4 |
|---|---|---|---|---|
| Rx1 | 0 | 0 | 0 | 0 |
| Rx2 | 0 | 0.1 | 0.1 | 0 |
| Rx3 | 0 | 0.1 | 0.1 | 0 |
| Rx4 | 0 | 0 | 0 | 0 |

As can be seen from a comparison drawn between the above encoded differential and non-encoded initial differential matrices, they reflect the same touch location information, demonstrating that, in the touch sensing device and method according to preferred embodiments of the present invention, even when decoding directly follows common mode suppression without a reversing process being intervened therebetween, the resulting two frames data shows the same differential signal distribution as the two frames of initial data. Therefore, no degradation will occur in touch sensing sensitivity. Moreover, this can avoid introduction of errors during the reversing process, additionally ensuring relatively high touch sensing sensitivity. Further, since it is not needed to arrange a reversing module in the readout circuitry, a relatively small circuitry area and low power consumption can be achieved.

Embodiments of the present invention also relate to an electronic apparatus including the above described touch detection device of the present invention. The electronic apparatus may be, for example, a display apparatus with touch sensing and displaying capabilities. The display apparatus may have a screen and a touch sensing layer disposed on the screen. When the touch sensing layer is touched, what is displayed on the screen may vary. The screen may be, for example, an OLED, LED or LCD screen. The electronic apparatus may be a mobile phone, a personal computer, a laptop, a personal digital assistant (PDA), a watch phone, a media player, a navigation apparatus, a game console, a tablet computer, a wearable apparatus, an electronic access control system, an electronic keyless entry or ignition system for a vehicle, or the like.

In the touch detection device and method and electronic apparatus of the present invention, each frame of touch related data corresponding to n*m capacitive nodes is obtained by producing n*m coupled signals from an encoding process and subjecting the n*m coupled signals to multiple access accumulation process, common mode suppression process, ADC process and decoding processes. Additionally, touch location information for the n*m capacitive nodes is obtained by acquiring two consecutive frames of touch related data and performing a subtraction operation between the two consecutive frames of touch related data. Therefore, relatively high touch sensing sensitivity is achievable. Before each single frame of touch related data resulting from decoding is subject to subtraction, common-mode analog voltage amounts subtracted in the common mode suppression process may be not added back. This avoids introduction of errors, as well as a larger circuitry area and increased power consumption.

The foregoing method and apparatus embodiments are described in a progressive manner, with the description of every embodiment focusing on its differences from one or more previous embodiments. Reference can be made between the embodiments if appropriate.

While the invention has been described above with reference to several preferred embodiments, it is not intended to be limited to these embodiments in any way. In light of the teachings hereinabove, any person of skill in the art may make various possible variations and changes to the disclosed embodiments without departing from the scope of the invention. Accordingly, any and all such simple variations, equivalent alternatives and modifications made to the foregoing embodiments without departing from the scope of the invention are intended to fall within the scope thereof.

What is claimed is:

1. A touch detection method, for detecting a change of capacitance at n*m capacitive nodes formed by m driving channels and n sensing channels, wherein both m and n are positive integers, the touch detection method comprising:
loading, in each encoding cycle, encoded drive signals onto the individual driving channels, capturing, through the individual sensing channels, n*m coupled signals generated at the individual capacitive nodes, and acquiring one frame of touch related data corresponding to the n*m capacitive nodes by performing multiple access accumulation process, common mode suppression process, analog-to-digital conversion (ADC) process and decoding processes on the coupled signals, wherein the common mode suppression process is performed to adjust n accumulated analog voltages obtained from the multiple access accumulation process into an input range of the ADC process; and
obtaining touch location information for the n*m capacitive nodes by acquiring two consecutive frames of said touch related data and performing a subtraction operation between the two consecutive frames of said touch related data,
wherein before performing the subtraction operation between the two consecutive frames of said touch related data, common-mode analog voltage amounts subtracted in the common mode suppression process are not added back for each frame of said touch related data.

2. The touch detection method of claim 1, wherein the two consecutive frames of said touch related data are a frame not associated with a touch event and a frame associated with a touch event respectively.

3. The touch detection method of claim 1, wherein each of the common-mode analog voltage amounts is determined by a common-mode component accumulated from the m encoded drive signals in each encoding operation.

4. The touch detection method of claim 1,
wherein the m encoded drive signals are generated in each encoding operation according to codes generated to be applied to the individual driving channels;
the multiple access accumulation process comprises capturing, through the individual sensing channels, the n*m coupled signals generated by the m driving channels at the individual capacitive nodes and obtaining the n accumulated analog voltages by performing multiple access accumulation operations on the coupled signals at the m capacitive nodes of each of the n sensing channels and the m encoded drive signals in each encoding operation;
the common mode suppression process comprises subtracting common-mode analog voltage amounts beyond the input range of the ADC process from the n accumulated analog voltages so as to generate n analog voltage signals to be decoded;
the ADC process comprises convert the n analog voltage signal to be decoded into n digital voltage signals to be decoded;
the decoding process comprises decoding the n digital voltage signals based on the codes applied to the m driving channels so as to generate said one frame of said touch related data for the n*m capacitive nodes.

5. The touch detection method of claim 4, wherein the one frame of said touch related data for the n*m capacitive nodes is generated by decoding n*k digital voltage signals corresponding to n*k accumulated analog voltages obtained from k encoding operations and n*k multiple access accumulation operations, wherein said decoding process is achieved by performing multiply-accumulate (MAC) operations on the n*k digital voltage signals and the k*m codes applied to the m driving channels in the k encoding operations, wherein k is a positive integer.

6. The touch detection method of claim 4, wherein the n accumulated analog voltages are adjusted into the input range of the ADC process by drawing or injecting a current.

7. The touch detection method of claim 6, wherein the n analog voltage signals to be decoded within the input range of the ADC process are generated from integrating charges at output nodes of the n sensing channels.

* * * * *